United States Patent
Shaw et al.

(10) Patent No.: US 8,050,335 B2
(45) Date of Patent: Nov. 1, 2011

(54) EQUAL PHASE COMBINING TECHNIQUE FOR A ROBUST OFDM SYSTEM

(75) Inventors: Amit Shaw, Bangalore (IN); Satyam Srivastava, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 693 days.

(21) Appl. No.: 12/170,460

(22) Filed: Jul. 10, 2008

(65) Prior Publication Data

US 2010/0008215 A1    Jan. 14, 2010

(51) Int. Cl.
*H04L 27/00* (2006.01)

(52) U.S. Cl. ......... 375/259; 375/285; 375/350; 370/206

(58) Field of Classification Search .......... 375/259–260, 375/285, 329, 324, 350, 340, 346, 354, 371; 370/203, 206
See application file for complete search history.

(56) References Cited

U.S. PATENT DOCUMENTS

| | | | |
|---|---|---|---|
| 6,549,583 B2 * | 4/2003 | Crawford | 375/260 |
| 6,633,616 B2 * | 10/2003 | Crawford | 375/326 |
| 7,593,378 B1 * | 9/2009 | Murali et al. | 370/338 |
| 2005/0036563 A1 * | 2/2005 | Suzuki et al. | 375/260 |
| 2006/0198472 A1 * | 9/2006 | Nakamura et al. | 375/343 |
| 2008/0118012 A1 * | 5/2008 | Corke et al. | 375/348 |

* cited by examiner

*Primary Examiner* — Jean B Corrielus
(74) *Attorney, Agent, or Firm* — Prakash Nama; Global IP Services, PLLC (57) ABSTRACT

A technique for an equal phase combining for a robust orthogonal frequency division multiplexing (OFDM) system under high delay spread channel is disclosed. In one embodiment, a method includes receiving and synchronizing transmitted OFDM symbols having cyclic prefixes via a symbol synchronizer module, removing the cyclic prefixes from the OFDM symbols, via a cyclic prefix remover module, to form time domain symbols, converting the time domain symbols to frequency domain symbols via an FFT module, equalizing a received sub-carrier with complex conjugate of estimated channel coefficients in frequency domain at the same sub-carrier frequency via an equalizer, combining the frequency domain symbols spread over multiple sub-carriers during transmission via a combiner, and detecting phase information from the mapped combined PSK constellation symbol via a detector module.

18 Claims, 6 Drawing Sheets

EQUAL PHASE COMBINING TECHNIQUE FOR A ROBUST OFDM SYSTEM

TECHNICAL FIELD OF THE INVENTION

The present invention relates to a communication system utilizing Orthogonal Frequency Multiplexing (OFDM) scheme, and more specifically to an equal phase combining technique for a robust OFDM system.

BACKGROUND

Orthogonal Frequency-Division Multiplexing (OFDM) is a multi-carrier modulation scheme, which uses a large number of closely-spaced orthogonal sub-carriers. Each sub-carrier is modulated with a conventional modulation scheme (such as phase-shift keying (PSK) and quadrature amplitude modulation (QAM)) at a low symbol rate, maintaining data rates similar to conventional single-carrier modulation schemes in the same bandwidth. OFDM has become popular for its ability to efficiently detect symbols under frequency selective channels at a low cost through a simple one tap equalization per sub-carrier in frequency domain. Under severe frequency selective channel, however, bit error rate performance may deteriorate.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A technique for an equal phase combining for a robust OFDM system is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
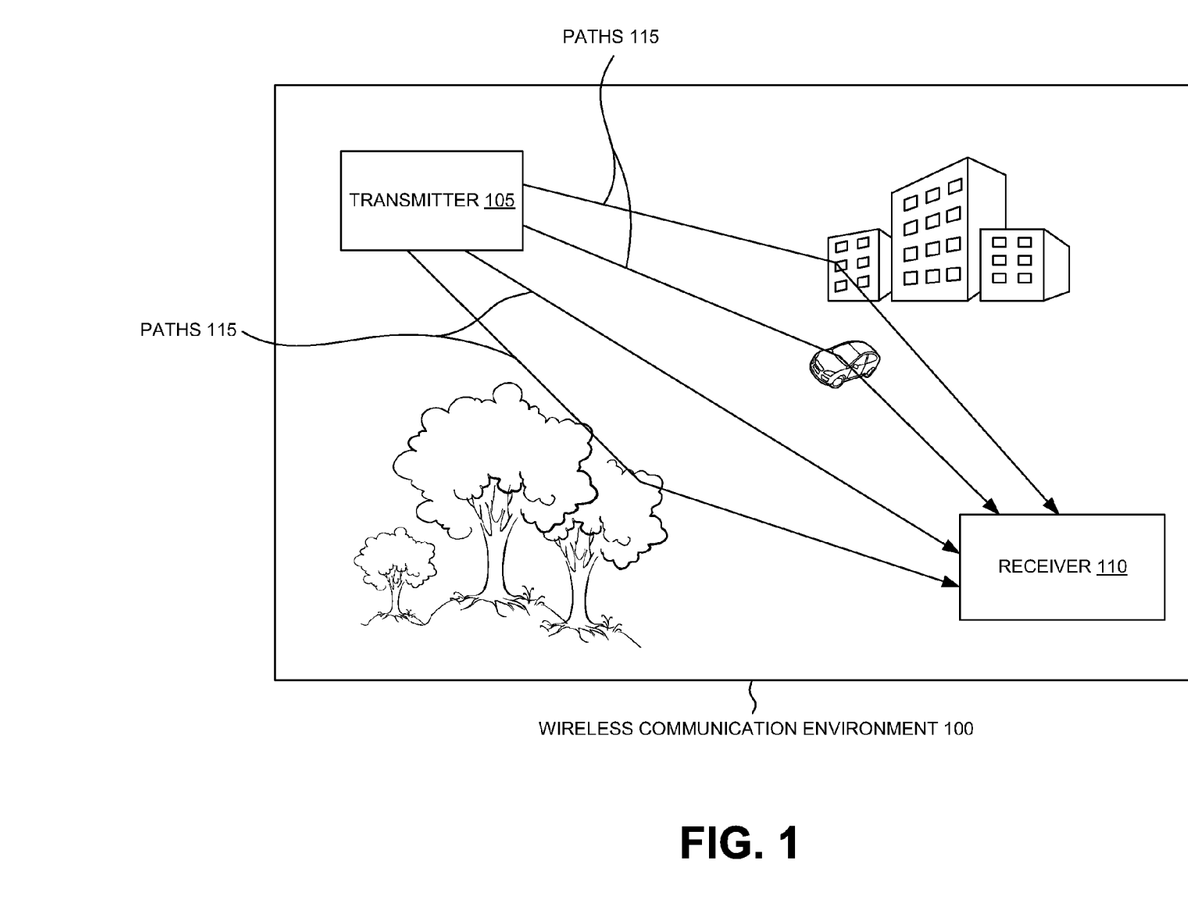
FIG. 1 illustrates a wireless communication environment using an orthogonal frequency division multiplexing (OFDM) system, according to one embodiment.

FIG. 1 illustrates a wireless communication environment 100, using an orthogonal frequency division multiplexing (OFDM) system, according to one embodiment. Particularly, FIG. 1 illustrates a transmitter 105, a receiver 110 and paths 115. FIG. 1 shows the wireless communication environment 100 (e.g., implementing OFDM transmission scheme in which available spectrum is divided into multiple carriers, each carrier being modulated by a low rate data stream) in which, OFDM symbols transmitted by the transmitter 105 experiences multi-path fading due to the presence of reflectors (e.g., buildings, trees, vehicles, etc.) in the environment surrounding the transmitter 105 and the receiver 110 (thereby creating multiple paths 115).

As shown in FIG. 1, the transmitter 105 transmits the OFDM symbols and the receiver 110 receives the OFDM symbols transmitted from the transmitter 105. If path 115 from the transmitter 105 to the receiver 110 has reflections (for instance, signal may bounce off buildings) or refractions (such as through foliage of trees), the multi-path fading may result. Multi-path fading refers to a distortion that a carrier-modulated signal experiences over a propagation media. In this case, the signal reaches the receiver 110 via many different paths 115 as shown in FIG. 1. Thus, the receiver 110 sees superposition of multiple copies of the transmitted signal, each traversing a different path 115.

Each signal copy may experience different attenuation, delay and phase shift while traveling from the transmitter 105 to the receiver 110. For example, the time delay may result in overlapping of a part or all of a given symbol into subsequent symbol(s). The time delay between the different paths of the signal may lead to delay spread of the signal in the wireless communication environment 100, thereby resulting in inter symbol interference (ISI) (i.e., distortion of the signal in which one symbol interferes with subsequent symbols). The delay spread of the signal results in ISI thereby, deteriorating the orthogonal nature of the sub-carriers of the OFDM symbols (i.e., interfering with correct detection and demodulation of the OFDM symbols). This is conventionally handled by cyclically prefixing OFDM symbols known as guard interval with duration depending on the maximum delay spread experienced by the received signal. The cyclic prefix is dropped at the receiver before demodulation and thus maintaining the orthogonal nature of the sub-carriers of OFDM symbols under channel spread.

Further, the differences in attenuation, delay and phase shift of the different signals causes the transmitted signals to interfere with each other, thereby resulting in a frequency selective channel. The frequency selective channel refers to channel having frequency dependent fades caused when channel coherence bandwidth is lower than the signal bandwidth. Coherence bandwidth is approximate maximum bandwidth or frequency interval over which two frequencies of a signal are likely to experience comparable or correlated amplitude fading. Thus, under severe frequency selective distortion, bit error rate (BER) performance deteriorates. Hence, it is desirable to provide a robust OFDM system under very severe frequency selective distortion by exploiting the frequency diversity (i.e., by spreading data over multiple sub-carriers) and using equal phase combining at the receiver 110. This can be achieved through equalizing sub-carriers at the receiver with complex conjugate of estimated channel coefficients of the sub-carrier such that less weight is given to the sub-carriers having a deep fade (low SNR) and a greater weight to the subcarriers with a low fade (high SNR) while combining. One skilled in the art will appreciate implementation of the equal phase combining technique at the receiver 110 in the above-described wireless communication environment 100 for improving the BER performance under severe frequency selective channel. Further, the receiver 110 having equalizer, combiner and detector to implement the equal phase combining technique in the wireless communication environment 100 is described in greater detail in FIG. 3.

Figure 2:
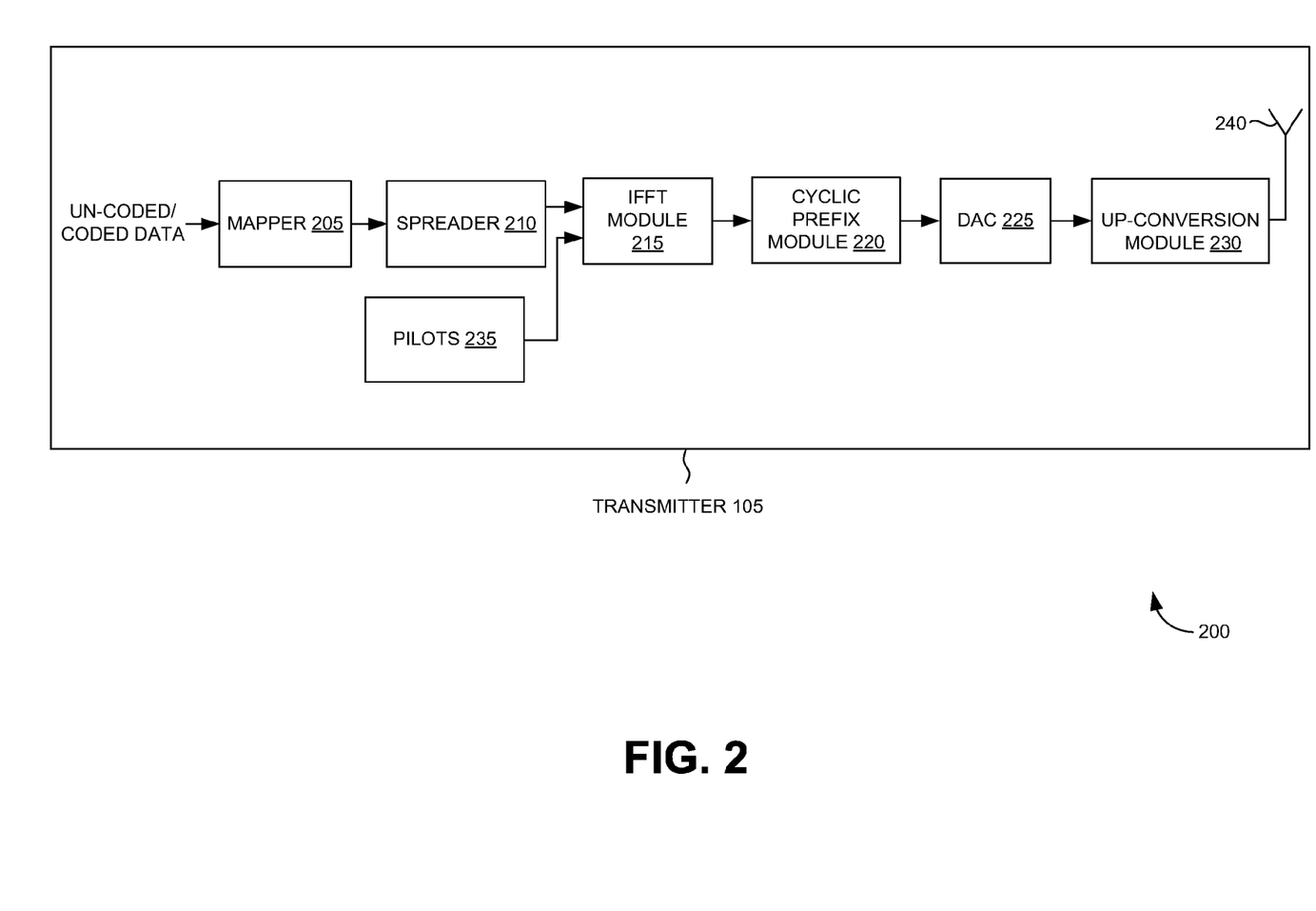
FIG. 2 illustrates various components of the transmitter of FIG. 1, according to one embodiment.

FIG. 2 illustrates various components of the transmitter 105 of FIG. 1, according to one embodiment. Particularly, FIG. 2 illustrates a mapper 205, a spreader 210, an inverse FFT (IFFT) module 215, a cyclic prefix module 220, a digital to analog converter (DAC) 225, an up-conversion module 230, pilots 235 and an antenna 240. The transmitter 105 divides high-speed serial information signal into multiple lower-speed sub-signals and transmits the lower-speed sub-signals simultaneously at different frequencies in parallel.

In operation, the mapper 205 receives data and maps the data by phase shift-keying (PSK) constellations to form data symbols. For example, the input data mapped by the mapper 205 may be coded or un-coded data. Further, the data symbols are spread over multiple sub-carriers in OFDM symbol(s) by the spreader 210. The pilots 235 insert pilot sub-carriers having known symbols in the multiple sub-carriers in the OFDM symbol. The pilot sub-carriers are inserted to compensate for frequency and phase errors at the receiver. Also, the pilot sub-carriers may be used for frame detection, carrier frequency offset estimation and channel estimation.

Further, the pilot inserted spread data symbols are passed through the IFFT module 215. The IFFT module 215 converts the spread data symbols to time domain symbols through inverse Fast Fourier Transforms (FFT). In other words, the IFFT module 215 converts a number of complex data points, of length that is a power of 2, to the time domain symbol of the same number of samples. These time domain symbols are then cyclically prefixed via the cyclic prefix module 220 to form OFDM symbols. The cyclic prefixed to the time domain symbols retains sinusoids' properties in multipath channels, mitigates effects of link fading and ISI. The cyclic prefixed time domain symbols (i.e., the OFDM symbols) in digital form are converted into analog form via the DAC 225. Further, the up-conversion module 230 up-converts the OFDM symbols (e.g., from a baseband signal to an intermediate frequency (IF) and then from the IF to a radio frequency (RF)) and transmits the OFDM symbols to the receiver 110 via the antenna 240. Below description of FIG. 3 explains exploitation of frequency diversities through usage of equal phase combining technique at the receiver 110.

Figure 3:
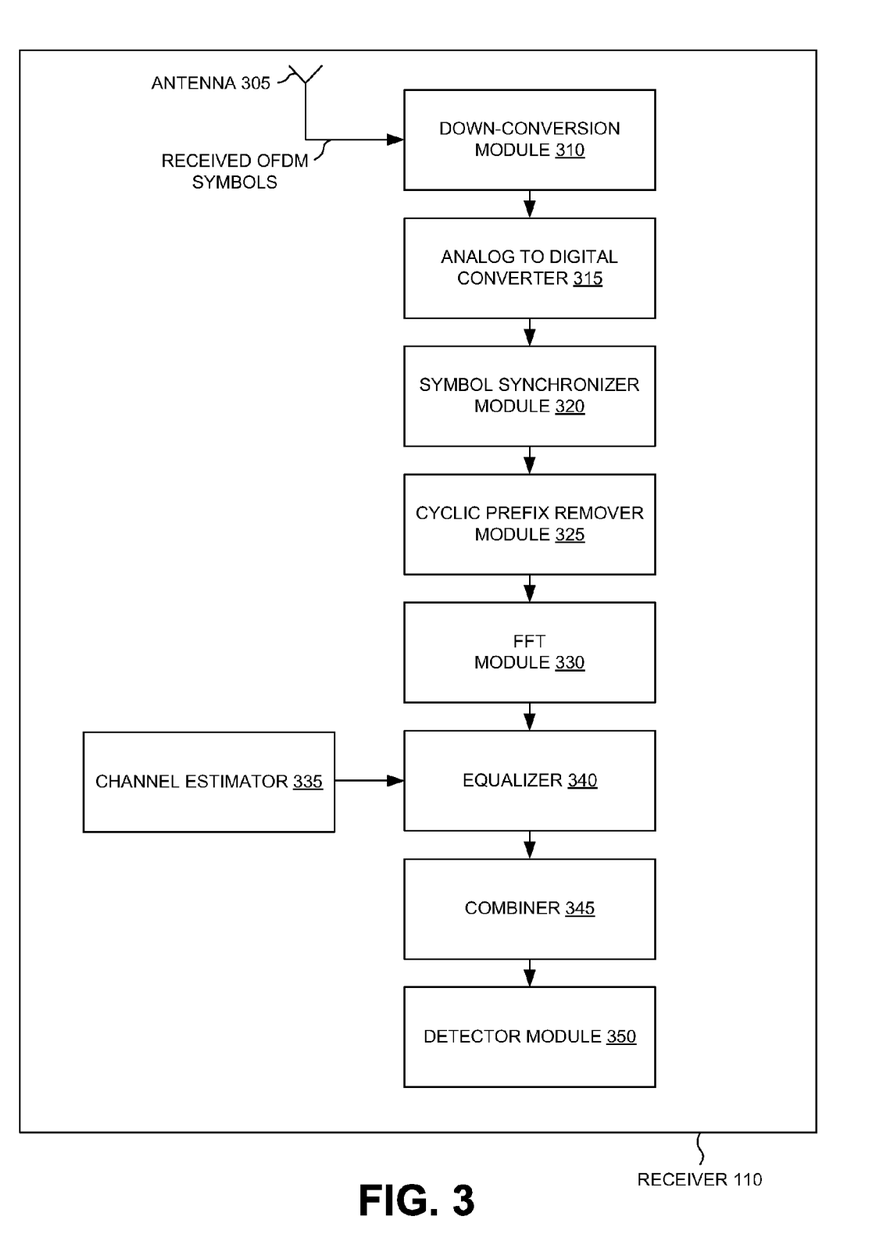
FIG. 3 illustrates various components of the receiver of FIG. 1, for implementing equal phase combining technique, according to one embodiment.

FIG. 3 illustrates various components of the receiver 110 of FIG. 1 implementing equal phase combining technique, according to one embodiment. Particularly, FIG. 3 illustrates an antenna 305, a down-conversion module 310, an analog to digital converter (ADC) 315, a symbol synchronizer module 320, a cyclic prefix remover module 325, an FFT module 330, a channel estimator 335, an equalizer 340, a combiner 345, a detector module 350.

The receiver 110 shown in FIG. 3, uses an equal phase combining technique to provide a robust OFDM system under severe frequency selective channel, i.e., the equalizer 340, the combiner 345 and the detector 350 of the receiver 110 helps in improving BER performance under severe frequency selective channel.

In the receiver 110, the antenna 305 receives the transmitted OFDM signal and passes it through the down-conversion module 310 and the ADC 315 to generate the digital samples. The symbol synchronizer module 320 synchronizes the digital samples of the received OFDM symbols having cyclic prefixes. Further, the output from the symbol synchronizer module 320 is passed through the cyclic prefix remover module 325 that removes the cyclic prefixes from the OFDM symbols to form time domain symbols. These time domain symbols are passed through the FFT module 330. The FFT module 330 converts the time domain symbols to frequency domain symbols. In one embodiment, the converting the time domain samples to frequency domain symbols via an FFT module 330 can be expressed as:

$$Y_k = H_k \cdot X_k + N_k,$$

where, $Y_k$ is the received $k^{th}$ subcarrier data, $H_k$ is a frequency domain channel transfer function at the $k^{th}$ sub-carrier, $X_k$ is the $k^{th}$ sub-carrier data transmitted, and $N_k$ is noise (which is approximated as Gaussian) at the $k^{th}$ sub-carrier.

Further, the channel estimator 335 of the receiver 110 estimates channel coefficients in frequency domain through a known OFDM symbol transmitted at any position in each transmitted packet. In some embodiments, during the data mode, the equalizer 340 equalizes a received sub-carrier with complex conjugate of the estimated channel coefficients in frequency domain at the same sub-carrier frequency. In these embodiments, the subcarriers are weighted with the complex conjugate of the estimated channel coefficients of the sub-carriers such that less weight is given to the subcarriers having a deep fade (low signal-to-noise ratio (SNR)).

Upon equalizing, the combiner 345 combines the frequency domain symbols spread over the multiple sub-carriers during transmission. The combining of the symbols spread over multiple sub-carriers during transmission can be expressed as follows:

$$\hat{X}_K = \sum_{k_i \in K} H_{k_i}^* \cdot Y_{k_i},$$

wherein, K is a set of sub-carrier indices $\{k_i\}$ where the same data $X_K$ is spread. Further, the above expression can be expanded as:

$$\hat{X}_K = \sum_{k_i \in K} (H_{k_i}^* \cdot H_{k_i} \cdot X_K + H_{k_i}^* \cdot N_{k_i});$$

and $$\hat{X}_K = \sum_{k_i \in K} (|H_{k_i}|^2 \cdot X_K + H_{k_i}^* \cdot N_{k_i}),$$

From the above expression, it can be noted that a $k^{th}$ sub-carrier is weighted by a factor $|H_k|^2$ to give a relatively lesser weight to the $k^{th}$ sub-carrier having a deep fade (low SNR) and to give a relatively greater weight to the $k^{th}$ sub-carrier having a low fade (high SNR).

In some embodiments, the detector module 350 detects phase information from the combined symbols. For example, the phase information can be recovered from the combined symbols, as the data symbols are mapped with the PSK constellation in the transmitter 105. It can be noted that in this method, magnitude equalization has been avoided as the PSK constellations do not carry any information in magnitude. The magnitude equalization in subcarriers with deep fade results in additive noise term to be enhanced and thus degrading system performance. Further, it can be noted that noise enhancement due to channel fading has also been avoided as the magnitude equalization is avoided in the present invention. In this manner, the equal phase combining technique at the receiver 110 performs better in terms of BER and thus provides a robust OFDM system under severe frequency selective channel.

Figure 4:
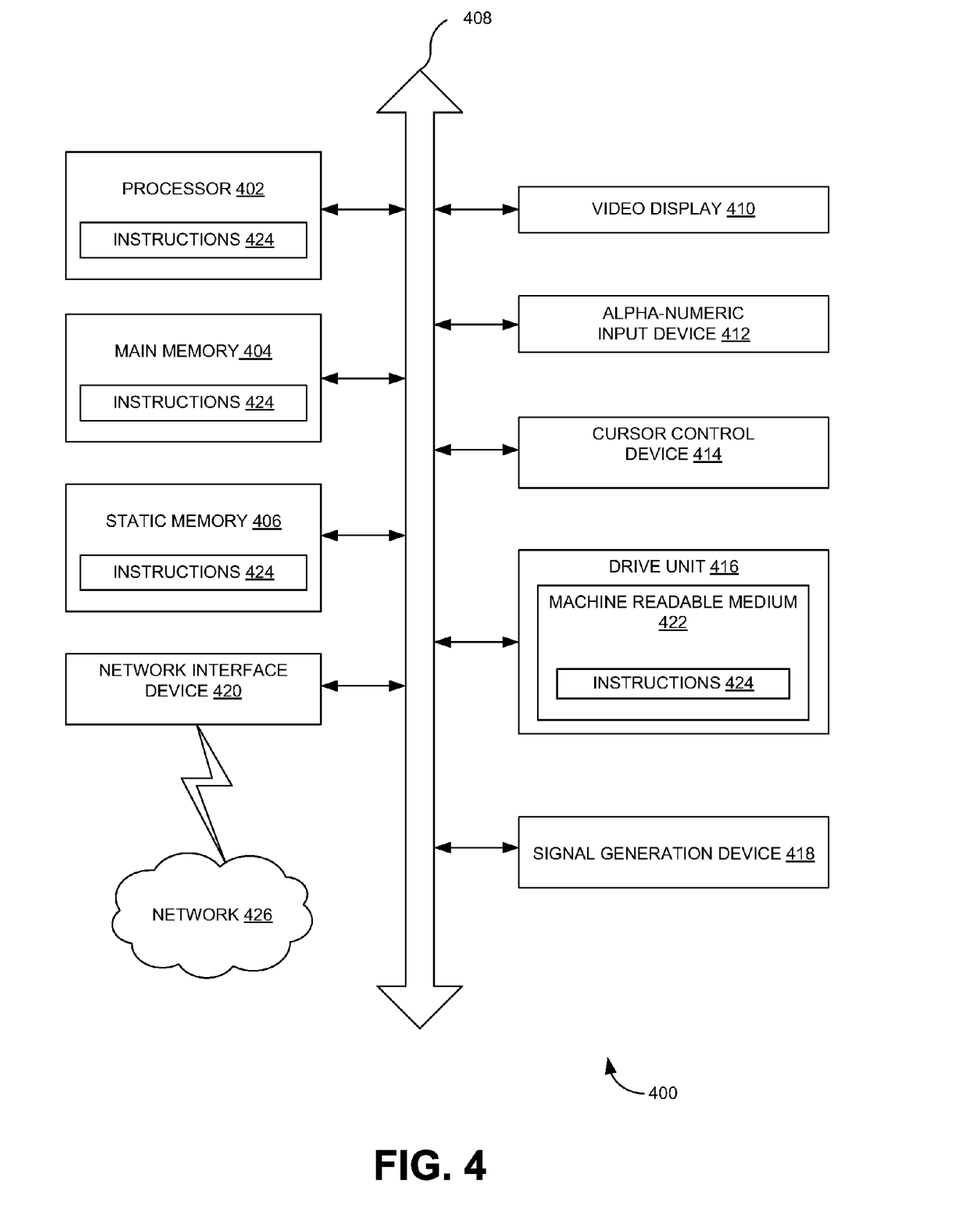
FIG. 4 is a diagrammatic system view of a data processing system in which any of the embodiments disclosed herein may be performed, according to one embodiment.

FIG. 4 is a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424, and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a BIOS and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, the instructions when executed by a computing platform result in execution of an OFDM method including receiving and synchronizing transmitted OFDM symbols having cyclic prefixes via the symbol synchronizer module 320, removing, via the cyclic prefix remover module 325, the cyclic prefixes from the OFDM symbols to form time domain symbols, converting, via the FFT module 330, the time domain symbols to frequency domain symbols, equalizing, via the equalizer 340, a received sub-carrier with complex conjugate of estimated channel coefficients in frequency domain at the same sub-carrier frequency, combining, via the combiner 345, the frequency domain symbols spread over multiple sub-carriers during transmission, and detecting, via the detector module 350, phase information from the mapped combined PSK constellation symbol. In some embodiments, the combining, via the combiner 345, the frequency domain symbols spread over multiple sub-carriers during transmission is expressed as:

$$\hat{X}_K = \sum_{k_i \in K} H_{k_i}^* \cdot Y_{k_i},$$

wherein, K is a set of sub-carrier indices {$k_i$} where the same data $X_K$ is spread.

Further, the above expression can be expanded as:

$$\hat{X}_K = \sum_{k_i \in K} (H_{k_i}^* \cdot H_{k_i} \cdot X_K + H_{k_i}^* \cdot N_{k_i});$$

and $$\hat{X}_K = \sum_{k_i \in K} (|H_{k_i}|^2 \cdot X_K + H_{k_i}^* \cdot N_{k_i}),$$

From the above expression, it can be noted that a $k^{th}$ sub-carrier is weighted by a factor $|H_k|^2$ to give a relatively lesser weight to the $k^{th}$ sub-carrier having a deep fade (low SNR) and to give a relatively greater weight to the $k^{th}$ sub-carrier having a low fade (high SNR).

In one embodiment, the storage medium may have instructions to weight the sub-carriers with the complex conjugate of the estimated channel coefficients of the sub-carrier such that less weight is given to the sub-carriers having a deep fade (low SNR) and a greater weight to the subcarriers with a low fade (high SNR).

Figure 5:
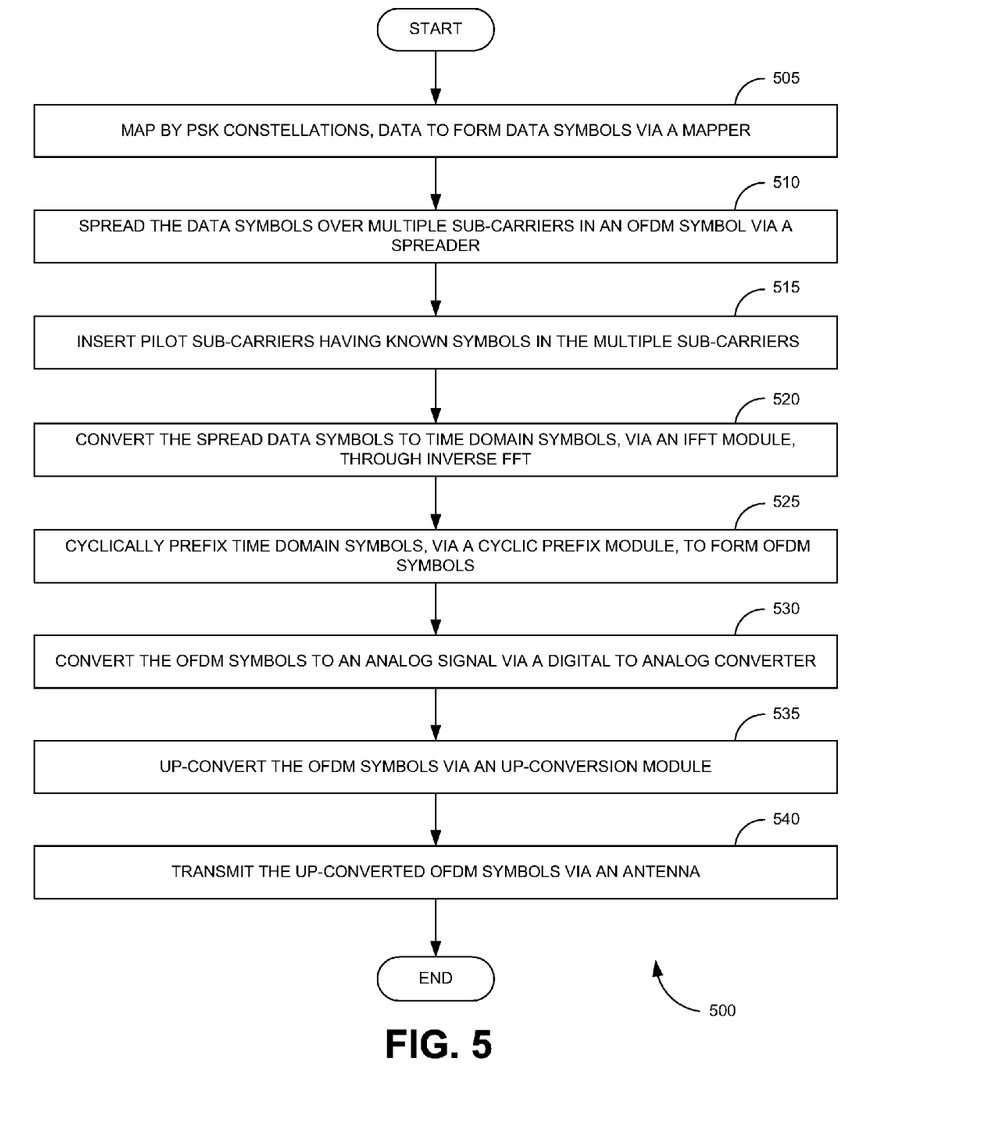
FIG. 5 is a process flow illustrating transmission of OFDM symbols using the transmitter shown in FIG. 1, according to one embodiment.

FIG. 5 is a process flow 500 illustrating transmission of OFDM symbols using the transmitter shown in FIG. 1, according to one embodiment. Particularly, FIG. 5 illustrates a method of obtaining the OFDM symbols and transmitting the OFDM symbols to the receiver 110. In operation 505, data is mapped by PSK constellations, via a mapper 205, to form data symbols. In operation 510, the data symbols are spread over multiple sub-carriers in an OFDM symbol via a spreader 210. In operation 515, pilot sub-carriers having known symbols are inserted in the multiple sub-carriers in the OFDM symbol. In one embodiment, the pilot sub-carriers are inserted to compensate for frequency and phase errors at the receiver 110. In another embodiment, the pilot sub-carriers may be used for frame detection, carrier frequency offset estimation, and channel estimation. In operation 520, the spread data symbols are converted to time domain symbols, via an IFFT module 215, through inverse FFT. In operation 525, the time domain symbols are cyclically prefixed, via a cyclic prefix module 220, to form the OFDM symbols.

In operation 530, the OFDM symbols are converted to an analog signal, via a DAC 225. In operation 535, the OFDM symbols are up-converted via an up-conversion module 230. In operation 540, the up-converted OFDM symbols are transmitted via an antenna 240.

Figure 6:
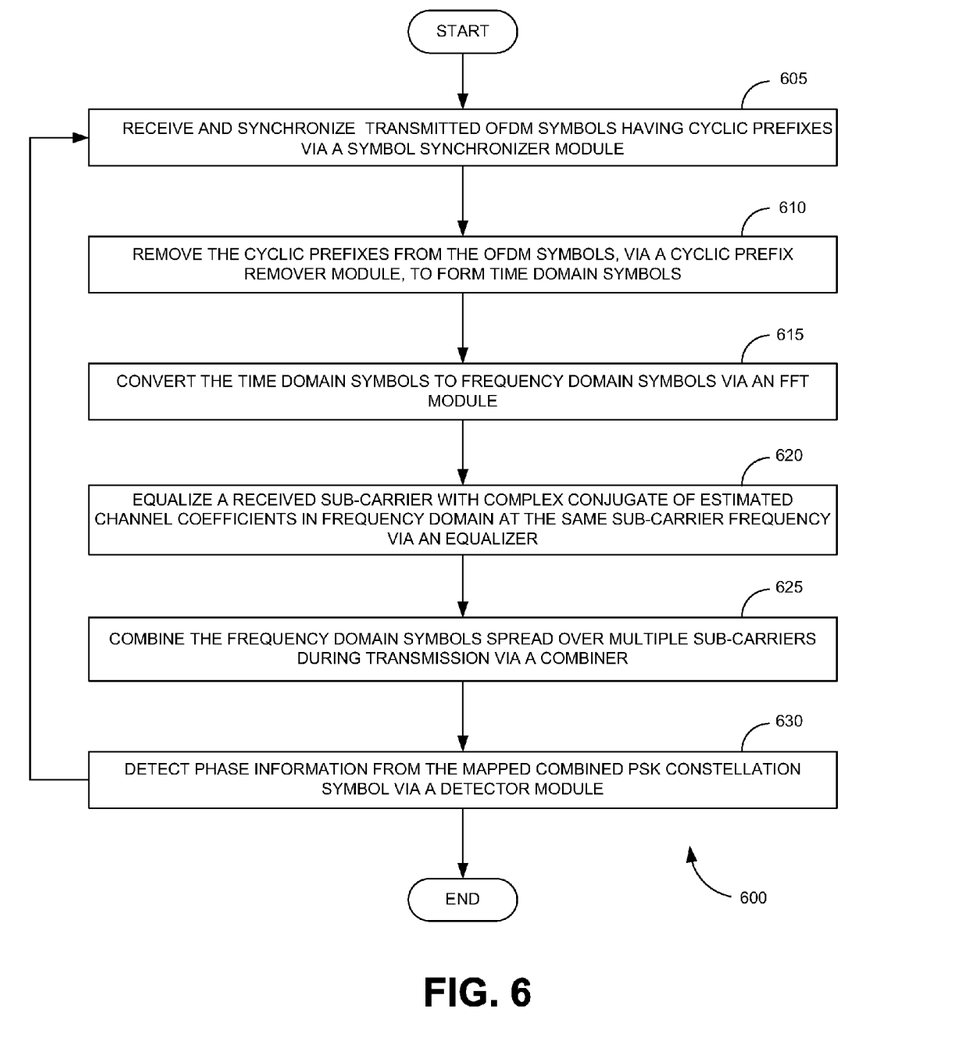
FIG. 6 is a process flow illustrating an equal phase combining method in a receiver, according to one embodiment.

FIG. 6 is a process flow 600 illustrating an equal phase combining method in a receiver 110, according to one embodiment. In operation 605, transmitted OFDM symbols having cyclic prefixes are received and synchronized via a symbol synchronizer module 320. In operation 610, the cyclic prefixes are removed from the OFDM symbols, via a cyclic prefix remover module 325, to form time domain symbols. In operation 615, the time domain symbols are converted to frequency domain symbols via an FFT module 330. The converting the time domain samples to frequency domain symbols via an FFT module 330 can be expressed as:

$$Y_k = H_k \cdot X_k + N_k,$$

where, $Y_k$ is the received $k^{th}$ subcarrier data, $H_k$ is a frequency domain channel transfer function at the $k^{th}$ sub-carrier, $X_k$ is the $k^{th}$ sub-carrier data transmitted, and $N_k$ is noise at the $k^{th}$ sub-carrier.

In operation 620, a received sub-carrier is equalized with complex conjugate of estimated channel coefficients in frequency domain at the same sub-carrier frequency via an equalizer 340. In one embodiment, equalizing operation includes weighting the subcarriers with the complex conjugate of the estimated channel coefficients of the sub-carriers such that less weight is given to the subcarriers having a deep fade (low SNR).

In operation 625, the frequency domain symbols spread over multiple sub-carriers during transmission are combined via a combiner 345. In one embodiment, the combining of the frequency domain symbols spread over multiple subcarriers is expressed as follows:

$$\hat{X}_K = \sum_{k_i \in K} H_{k_i}^* \cdot Y_{k_i},$$

wherein, K is a set of sub-carrier indices $\{k_i\}$ where the same data $X_K$ is spread. Further, the above expression can be expanded as:

$$\hat{X}_K = \sum_{k_i \in K} (H_{k_i}^* \cdot H_{k_i} \cdot X_K + H_{k_i}^* \cdot N_{k_i});$$

and $$\hat{X}_K = \sum_{k_i \in K} (|H_{k_i}|^2 \cdot X_K + H_{k_i}^* \cdot N_{k_i}),$$

where a $k^{th}$ sub-carrier is weighted by a factor $|H_k|^2$ to give a relatively lesser weight to the $k^{th}$ sub-carrier having a deep fade (low SNR) and to give a relatively greater weight to the $k^{th}$ sub-carrier having a low fade (high SNR). In operation 630, phase information is detected from the mapped combined PSK constellation symbol via a detector module 350. The process 600 is goes back to operation 605 and repeats operations 605-630 for next OFDM symbols.

The above-described method uses equal phase combining at the receiver 110 to provide a robust OFDM system under high delay spread channel. Also, the above described technique improves BER performance under severe frequency selective channel. Further, the above-described technique avoids noise enhancement due to channel fading.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   receiving and synchronizing, via a symbol synchronizer module of a receiver, a transmitted data packet comprising orthogonal frequency division multiplexing (OFDM) symbols having cyclic prefixes;
   removing, via a cyclic prefix remover module, the cyclic prefixes from the OFDM symbols to form time domain symbols;
   converting, via a fast fourier transform (FFT) module, the time domain symbols to frequency domain symbols consisting of multiple sub-carriers;
   estimating, via a channel estimator, channel coefficients at the multiple sub-carriers of the frequency domain symbols through at least one known OFDM symbol of the OFDM symbols transmitted at any position of the data packet;
   equalizing, via an equalizer, the multiple sub-carriers of the frequency domain symbols with complex conjugate of the estimated channel coefficients at respective sub-carrier frequencies;
   combining, via a combiner, the frequency domain symbols spread over the multiple sub-carriers during transmission upon equalizing the multiple sub-carriers; and
   detecting, via a detector module, phase information of the combined frequency domain symbols.

2. The method of claim 1, further comprising:
   obtaining the transmitted data packet comprising of OFDM symbols via:
   mapping by phase shift keying (PSK) constellations, via a mapper, data to form data symbols;
   spreading, via a spreader, the data symbols over multiple sub-carriers in OFDM symbol(s);
   converting, via an inverse FFT (IFFT) module, the spread data symbols to time domain symbols through inverse FFT; and
   cyclically prefixing, via a cyclic prefix module, the time domain symbols to form the OFDM symbols.

3. The method of claim 2, further comprising:
   converting, via a digital to analog converter, the OFDM symbols to an analog signal;
   up-converting, via an up-conversion module, the analog signal; and
   transmitting, via an antenna, the up-converted analog signal.

4. The method of claim 1, wherein the converting, via an FFT module, the time domain symbols to frequency domain symbols is expressed as:

$$Y_k = H_k \cdot X_k + N_k,$$

wherein $Y_k$ is received $k^{th}$ sub-carrier data, $H_k$ is a frequency domain channel transfer function at the $k^{th}$ sub-carrier, $X_k$ is the $k^{th}$ sub-carrier data transmitted, and $N_k$ is noise at the $k^{th}$ sub-carrier.

5. The method of claim 1, wherein the equalizing, via an equalizer, the multiple sub-carriers of the frequency domain symbols with complex conjugate of the estimated channel coefficients at respective subcarrier frequencies comprises:
   weighting the sub-carriers with the complex conjugate of the estimated channel coefficients of the sub-carrier such that less weight is given to the sub-carriers having a low signal-to-noise ratio.

6. The method of claim 1, wherein the combining, via a combiner, the frequency domain symbols spread over the multiple sub-carriers during transmission comprises:

$$\hat{X}_K = \sum_{k_i \in K} H_{k_i}^* \cdot Y_{k_i},$$

wherein, K is a set of sub-carrier indices $\{k_i\}$ where the same data $X_K$ is spread, $\hat{X}_K$ is an estimate of $X_K$, $Y_{k_i}$ is the received $k_i^{th}$ subcarrier data, $H_{k_i}$ the frequency domain channel transfer function at the $k_i^{th}$ sub-carrier, * is the complex conjugate operator.

7. The method of claim 6, wherein the expression $$\hat{X}_K = \sum_{k_i \in K} H_{k_i}^* \cdot Y_{k_i}$$

is expanded as:

$$\hat{X}_K = \sum_{k_i \in K} (H_{k_i}^* \cdot H_{k_i} \cdot X_K + H_{k_i}^* \cdot N_{k_i});$$

or $$\hat{X}_K = \sum_{k_i \in K} (|H_{k_i}|^2 \cdot X_K + H_{k_i}^* \cdot N_{k_i}),$$

wherein a $k_i^{th}$ sub-carrier is weighted by a factor $|H_{k_i}|^2$ to give a relatively lesser weight to the $k_i^{th}$ sub-carrier having a low signal-to-noise ratio and to give a relatively greater weight to the $k_i^{th}$ sub-carrier having a high signal-to-noise ratio, and $N_{k_i}$ is noise at the $k_i^{th}$ sub-carrier.

8. A system comprising a receiver, wherein the receiver comprises:
a symbol synchronizer module to receive and synchronize a transmitted data packet comprising orthogonal frequency division multiplexing (OFDM) symbols having cyclic prefixes;
a cyclic prefix remover module to remove the cyclic prefixes from the OFDM symbols to form time domain symbols;
a fast fourier transform (FFT) module to convert the time domain symbols to frequency domain symbols consisting of multiple sub-carriers;
a channel estimator to estimate channel coefficients at the multiple sub-carriers of the frequency domain symbols through at least one known OFDM symbol of the OFDM symbols transmitted at any position of the data packet;
an equalizer to equalize the multiple sub-carriers of the frequency domain symbols with complex conjugate of the estimated channel coefficients at respective sub-carrier frequencies;
a combiner to combine the frequency domain symbols spread over the multiple sub-carriers during transmission upon equalizing the multiple sub-carriers; and
a detector module to detect phase information of the combined frequency domain symbols.

9. The system of claim 8, further comprising a transmitter, wherein the transmitter comprises:
a mapper to map, by phase shift keying (PSK) constellations, data to form data symbols;
a spreader to spread the data symbols over multiple sub-carriers in an OFDM symbol; an inverse FFT (IFFT) module to convert the spread data symbols to time domain symbols through inverse FFT; and
a cyclic prefix module to cyclically prefix the time domain symbols to form the OFDM symbols.

10. The system of claim 9, further comprising:
a digital to analog converter to convert the OFDM symbols to an analog signal;
an up-conversion module to up-convert the analog signal; and
an antenna to transmit the up-converted analog signal.

11. The system of claim 8, wherein the conversion of the time domain symbols to frequency domain symbols is expressed as:

$$Y_k = H_k \cdot X_k + N_k,$$

wherein, $Y_k$ is received $k^{th}$ sub-carrier data, $H_k$ is a frequency domain channel transfer function at the $k^{th}$ sub-carrier, $X_k$ is the $k^{th}$ sub-carrier data transmitted, and $N_k$ is noise at the $k^{th}$ sub-carrier.

12. The system of claim 8, wherein the equalizer further weights the sub-carriers with the complex conjugate of the estimated channel coefficients of the sub-carrier such that less weight is given to the sub-carriers having a low signal-to-noise ratio.

13. The system of claim 8, wherein the combiner further combines according to a formula:

$$\hat{X}_K = \sum_{k_i \in K} H_{k_i}^* \cdot Y_{k_i},$$

wherein, K is a set of sub-carrier indices $\{k_i\}$ where the same data $X_K$ is spread, $\hat{X}_K$ is an estimate of $X_K$, $Y_{k_i}$ is the received $k_i^{th}$ subcarrier data, $H_{k_i}$ is the frequency domain channel transfer function at the $k_i^{th}$ sub-carrier, * is the complex conjugate operator.

14. The system of claim 13, wherein the expression $$\hat{X}_K = \sum_{k_i \in K} H_{k_i}^* \cdot Y_{k_i}$$

is expanded as:

$$\hat{X}_K = \sum_{k_i \in K} (H_{k_i}^* \cdot H_{k_i} \cdot X_K + H_{k_i}^* \cdot N_{k_i});$$

or $$\hat{X}_K = \sum_{k_i \in K} (|H_{k_i}|^2 \cdot X_K + H_{k_i}^* \cdot N_{k_i}),$$

wherein a $k_i^{th}$ sub-carrier is weighted by a factor $|H_{k_i}|^2$ to give a relatively lesser weight to the $k_i^{th}$ sub-carrier having a low signal-to-noise ratio and to give a relatively greater weight to the $k_i^{th}$ sub-carrier having a high signal-to-noise ratio, and $N_{k_i}$ is noise at the $k_i^{th}$ sub-carrier.

15. A non-transitory computer readable storage medium having instructions, that when executed by a computing platform, result in execution of an orthogonal frequency division multiplexing (OFDM) method comprising:
receiving and synchronizing, via a symbol synchronizer module, a transmitted data packet comprising OFDM symbols having cyclic prefixes;
removing, via a cyclic prefix remover module, the cyclic prefixes from the OFDM symbols to form time domain symbols;
converting, via a fast fourier transform (FFT) module, the time domain symbols to frequency domain symbols consisting of multiple sub-carriers;
estimating, via a channel estimator, channel coefficients at the multiple sub-carriers of the frequency domain symbols through at least one known OFDM symbol of the OFDM symbols transmitted at any position of the data packet;

equalizing, via an equalizer, the multiple sub-carriers of the frequency domain symbols with complex conjugate of the estimated channel coefficients at respective sub-carrier frequencies;

combining, via a combiner, the frequency domain symbols spread over the multiple sub-carriers during transmission upon equalizing the multiple sub-carriers; and detecting, via a detector module, phase information of the combined frequency domain symbols.

16. The non-transitory computer readable storage medium of claim 15, further comprising:

weighting the sub-carriers with the complex conjugate of the estimated channel coefficients of the sub-carrier such that less weight is given to the sub-carriers having a low signal to noise ratio and a greater weight to the subcarriers with a high signal to noise ratio.

17. The non-transitory computer readable storage medium of claim 15, wherein the combining, via a combiner, the frequency domain symbols spread over the multiple sub-carriers during transmission is expressed as:

$$\hat{X}_K = \sum_{k_i \in K} H^*_{k_i} \cdot Y_{k_i}$$

wherein K is a set of sub-carrier indices $\{k_i\}$ where the same data $X_K$ is spread, $\hat{X}_K$ is an estimate of $X_K$, $Y_{k_i}$ is the received $k_i^{th}$ subcarrier data, $H_{k_i}$ is the frequency domain channel transfer function at the $k_i^{th}$ sub-carrier, * is the complex conjugate operator.

18. The non-transitory computer readable storage medium of claim 17, wherein the expression $$\hat{X}_K = \sum_{k_i \in K} H^*_{k_i} \cdot Y_{k_i}$$

is expanded as:

$$\hat{X}_K = \sum_{k_i \in K} (H^*_{k_i} \cdot H_{k_i} \cdot X_K + H^*_{k_i} \cdot N_{k_i}); \text{ or}$$

$$\hat{X}_K = \sum_{k_i \in K} (|H_{k_i}|^2 \cdot X_K + H^*_{k_i} \cdot N_{k_i}),$$

wherein a $k_i^{th}$ sub-carrier is weighted by a factor $|H_{k_i}|^2$ to give a relatively lesser weight to the $k_i^{th}$ sub-carrier having a low signal-to-noise ratio and to give a relatively greater weight to the $k_i^{th}$ sub-carrier having a high signal-to-noise ratio, and $N_{k_i}$ is noise at the $k_i^{th}$ sub-carrier.

* * * * *